United States Patent
De Piero et al.

(10) Patent No.: US 9,120,054 B2
(45) Date of Patent: Sep. 1, 2015

(54) HEAT EXCHANGER FOR A REFRIGERATED AIR DRYER

(75) Inventors: Paolo De Piero, Tavagnacco (IT); Maurizio Nardini, Pocenia (IT); Charles John Bergh, Berwyn, PA (US)

(73) Assignee: INGERSOLL-RAND COMPANY, Montvale, NJ (US)

( * ) Notice: Subject to any disclaimer, the term of this patent is extended or adjusted under 35 U.S.C. 154(b) by 488 days.

(21) Appl. No.: 13/437,830

(22) Filed: Apr. 2, 2012

(65) Prior Publication Data

US 2013/0000341 A1    Jan. 3, 2013

Related U.S. Application Data

(60) Provisional application No. 61/470,866, filed on Apr. 1, 2011.

(51) Int. Cl.
| | |
|---|---|
| *B01D 53/26* | (2006.01) |
| *F28D 9/00* | (2006.01) |
| *F28D 15/00* | (2006.01) |
| *F28D 20/00* | (2006.01) |
| *F28D 21/00* | (2006.01) |

(52) U.S. Cl.
CPC ............ *B01D 53/265* (2013.01); *F28D 9/0062* (2013.01); *F28D 9/0093* (2013.01); *F28D 15/00* (2013.01); *F28D 20/0034* (2013.01); *F28D 9/0068* (2013.01); *F28D 2021/0038* (2013.01); *Y02E 60/142* (2013.01)

(58) Field of Classification Search
CPC ... F28D 9/0062; F28D 9/0068; F28D 9/0093; F28D 15/00; F28D 20/0034; F28D 2021/0038; B01D 53/265; Y02E 60/142

USPC .................. 62/90, 173, 185, 201, 228.1, 430
See application file for complete search history.

(56) References Cited

U.S. PATENT DOCUMENTS

| | | | |
|---|---|---|---|
| 3,585,808 A * | 6/1971 | Huffman | 62/93 |
| 4,002,201 A | 1/1977 | Donaldson | |
| 5,228,504 A | 7/1993 | Mantegazza et al. | |
| 5,299,633 A | 4/1994 | Brüggemann et al. | |
| 5,337,577 A * | 8/1994 | Eiermann | 62/173 |
| 5,462,113 A | 10/1995 | Wand | |
| 5,893,411 A | 4/1999 | Nir | |
| 5,964,280 A | 10/1999 | Wehrmann et al. | |
| 6,085,529 A | 7/2000 | Galus et al. | |
| 6,089,313 A | 7/2000 | Levy et al. | |
| 6,142,221 A | 11/2000 | Johansson | |
| 6,164,371 A | 12/2000 | Bertilsson et al. | |

(Continued)

FOREIGN PATENT DOCUMENTS

JP        10141820        5/1998

OTHER PUBLICATIONS

Supplementary Search Report for EP12 76 4811 dated Sep. 8, 2014, 7 pages.

(Continued)

*Primary Examiner* — Marc Norman
(74) *Attorney, Agent, or Firm* — Taft Stettinius & Hollister LLP

(57) ABSTRACT

A refrigerated air dryer includes a three-path heat exchanger 18 having an air path 18a, a refrigerant path 18b, and a fluid path 18c. The three flow paths exchange heat within a single unit to provide a compact heat exchanger with improved thermal performance at a lower production cost.

28 Claims, 8 Drawing Sheets

(56) References Cited

U.S. PATENT DOCUMENTS

| | | |
|---|---|---|
| 6,237,358 B1 | 5/2001 | Kondo et al. |
| 6,305,466 B1 | 10/2001 | Andersson et al. |
| 6,470,693 B1 | 10/2002 | Dickey |
| 6,895,774 B1 | 5/2005 | Ares et al. |
| 7,481,073 B2 | 1/2009 | Carlin et al. |
| 2006/0080981 A1 | 4/2006 | King et al. |
| 2006/0266073 A1 | 11/2006 | Carlson et al. |
| 2007/0261682 A1 | 11/2007 | Smith |
| 2008/0173030 A1 | 7/2008 | Levan et al. |
| 2009/0100863 A1 | 4/2009 | Dee et al. |
| 2011/0061409 A2 | 3/2011 | Dering et al. |

OTHER PUBLICATIONS

English Language Abstract for JP10 141820 dated May 29, 1998, 1 Page.

* cited by examiner

US 9,120,054 B2

HEAT EXCHANGER FOR A REFRIGERATED AIR DRYER

RELATED APPLICATION DATA

This application claims the benefit of U.S. Provisional Application No. 61/470,866 filed Apr. 1, 2011.

BACKGROUND

The present invention relates to air compressor systems and arrangements for removing moisture and other contaminates from compressed air. Conventional air compressors generate what is referred to as wet compressed air, wherein the term "wet" refers to the fact that there is typically undesirable amounts of water vapor and other contaminants in the compressed air. Accordingly, air dryers are generally provided upstream from a point of use in compressed air systems and serve to remove moisture and other contaminates from the compressed air. A refrigerated air dryer operates to remove moisture from the air by cooling the air to cause moisture to condense, extracting the condensed moisture, and then reheating the air. Because the process of cooling the air requires energy input, there are significant energy costs to operating a refrigerated air dryer in addition to the costs of installing and maintaining the equipment, and for at least this reason there are needs for improved designs.

SUMMARY

One purpose of the invention is to provide an air chiller for a refrigerated air dryer capable of operating in two different cooling modes such that the cooling capacity of the air dryer can be modulated for improved thermal performance and/or for improved energy efficiency. Another purpose is to provide a refrigerated air dryer that is economical to produce and reliable in operation.

In one embodiment, the invention provides a refrigerated air dryer for use with an air compressor that produces hot, wet compressed air. A precooler/reheater is positioned downstream of the air compressor and receives the hot, wet compressed air and precools the air. A three path heat exchanger acts as the air chiller and includes an air path, a refrigerant path, and a fluid path. The precooled wet compressed air flows through the air path and is cooled below the dew point of the now cooled, wet compressed air. A liquid separator is located downstream of the three path heat exchanger and separates liquid water that has condensed out of the compressed air. A refrigerant system includes a refrigerant compressor, a condenser, and an expansion device. The refrigerant compressor compresses a refrigerant that passes through the condenser, through the expansion device, and through the refrigerant path in the three path heat exchanger. The refrigerant path acts as an evaporator such that the refrigerant removes heat from the three path heat exchanger. A fluid system includes a thermally insulated tank that contains a supply of a thermal storage fluid and a pump that pumps the fluid through the fluid path of the three path heat exchanger. During operation, when both air and fluid are flowing through the three path heat exchanger but refrigerant is not, the air is cooled and the temperature of the fluid rises. When air, fluid, and refrigerant are flowing through the thee path heat exchanger, both the air and the fluid are cooled.

In another embodiment the invention provides a heat exchanger for use in a refrigerated air dryer for a compressed air system. The heat exchanger includes an air path, a refrigerant path, and a fluid path. Each path includes several passageways through the heat exchanger and each passageway is adjacent at least one, and preferably at least two of the other passageways. In one arrangement, the passageways are arranged such that each air passageway is adjacent a refrigerant passageway and a fluid passageway. In another arrangement, each air passageway is adjacent two fluid passageways and each refrigerant passageway is adjacent two fluid passageways. In other words, every other passageway is a fluid passageway.

Other aspects of the invention will become apparent by consideration of the detailed description and accompanying drawings.

BRIEF DESCRIPTION OF THE DRAWINGS

Features of the invention will be better understood from the following detailed description when considered in reference to the accompanying drawings, in which.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
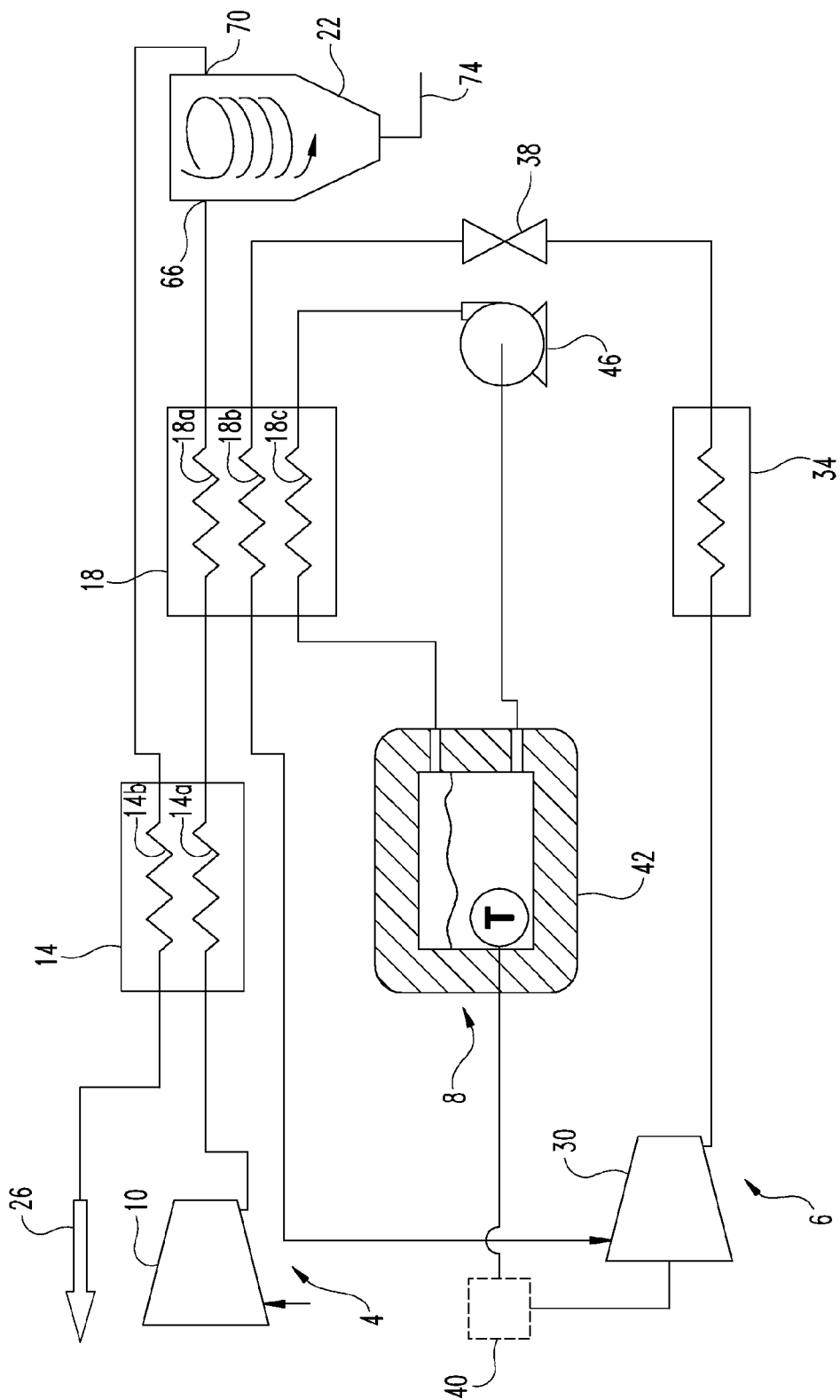
FIG. 1 is a schematic representation of a compressed air system according to the invention.

FIG. 1 shows an air compressor system that includes an air circuit 4, a refrigerant circuit 6, and a heat transfer/storage fluid circuit 8. The air circuit 4 includes an air compressor 10 that produces relatively wet compressed air, and a refrigerated air dryer including (in series) a first heat exchanger in the form of a precooler/reheater 14, a second heat exchanger in the form of a three-path heat exchanger 18, and a liquid separator 22. The refrigerated air dryer serves to remove moisture from the wet compressed air supplied to it by the compressor 10 such that the air circuit 4 provides dry compressed air to a point of use 26. The air compressor 10 may be a single compressor or a plurality of compressors arranged in parallel and/or series to output a flow of compressed air at a desired flow rate and pressure. The air circuit 4 may include other components for monitoring and regulating the air flow as understood in the art.

The refrigerant circuit 6 includes a refrigerant compressor 30, a condenser 34, an expansion device 38, and the three-path heat exchanger 18. The refrigerant compressor 30, the condenser 34, and the expansion device 38 are typical components of a refrigeration system. The three-path heat exchanger 18 acts as an evaporator in the refrigeration cycle. Accordingly, when the refrigerant circuit 6 is active, cold refrigerant is pumped through the heat exchanger 18, which draws heat into the refrigerant circuit 6 from the other two fluid circuits, and heat is expelled from the refrigerant circuit 6 in the condenser 34. The controller 40 modulates the operation of the refrigerant circuit 6 to provide cooling as needed, wherein the need for cooling may be determined based on a temperature in the heat transfer/storage fluid circuit 8 and/or in the air circuit 4. As illustrated, controller 40 is coupled to a thermostat T in the tank 42.

The heat transfer/storage fluid circuit 8 includes an insulated tank 42, a pump 46, and the three-path heat exchanger 18. The insulated tank 42 holds a quantity of a heat transfer transport and storage fluid that functions as a thermal sink. In the preferred construction, a glycol/water mix is used. The pump 46 pumps the glycol/water mix from the insulated tank 42 and through the three-path heat exchanger 18 in a continuous fashion such that the returning fluid is mixed with the bulk fluid in the tank 42. The temperature sensor T is positioned in the tank or alternatively along the input path between the tank 42 and the heat exchanger 18 so as to allow the controller 40 to determine the temperature of the fluid being input to the heat exchanger 18. Depending on operating conditions, the returning fluid may be warmer or colder than the bulk fluid in tank 42, which has an effect on the bulk fluid temperature in the tank 42. However, but due to the relatively large volume of fluid in the tank 42, the bulk fluid temperature in the tank 42 changes relatively gradually.

More specifically, when the refrigeration circuit 6 is active and operating conditions otherwise permit, there is net cooling of the glycol/water mix as it flows through the heat exchanger 18 such that it returns to the tank 42 colder than when it left. Operating in this mode for a period of time tends to gradually reduce the bulk temperature in the tank 42, which corresponds to a gradual buildup of cooling capacity in the fluid circuit 8. Conversely, when the refrigeration circuit 6 is not active, there is net heating of the glycol/water mix as it flows through the heat exchanger 18 (assuming there is compressed air to be cooled) such that it returns to the tank 42 warmer than when it left. This tends to gradually increase the bulk temperature of the fluid in tank 42, which corresponds to a gradual reduction of the stored cooling capacity of the fluid circuit.

With reference to the air circuit 4, the precooler/reheater 14 includes a precooling path 14a and a reheating path 14b in heat exchange relationship with each other. The precooling path 14a is in fluid communication between the air compressor 10 and the three-path heat exchanger 18. The reheating path 14b is in fluid communication between the liquid separator 22 and the point of use 26. Accordingly, heat from the incoming compressed air passing through the precooling path 14a is absorbed by the outgoing compressed air passing through the reheating path 14b. In this way, the compressed air flowing through the precooling path 14a is cooled (i.e., the temperature is reduced) and the compressed air in the reheating path 14b is heated (i.e., the temperature is increased). Reheating of the outgoing compressed air reduces the possibility of condensation downstream at the point of use 26, and the precooling of the incoming air reduces the cooling load on the three path heat exchanger 18. As illustrated, the precooler/reheater 14 is a counterflow heat exchanger, i.e. the direction of fluid flow through the precooling path 14a is predominantly in a direction that is opposite to the direction of flow through the reheating path 14b. In other embodiments, a predominantly co-flow or predominantly cross flow style heat exchanger may be utilized.

The three-path heat exchanger 18 is configured to allow heat transfer between the air circuit 4, the refrigerant circuit 6, and the heat transfer/storage circuit 8. The three-path heat exchanger 18 includes an air path 18a, a refrigerant path 18b, and a fluid path 18c, each in fluid contact with the respective circuit (4, 6, 8). The air path 18a is in fluid communication between the precooler/reheater 14 and the liquid separator 22 of the air circuit 4. The refrigerant path 18b is in fluid communication between the expansion device 38 and the refrigerant compressor 30 of the refrigerant circuit 6. The fluid path 18c is in fluid communication between the pump 46 and the insulated tank 42 of the heat transfer/storage fluid circuit 8. Each path 18a-c may be in heat transfer relationship with each of the other paths so as to allow heat to transfer between the fluids flowing through the heat exchanger as relative temperatures and system conditions dictate.

Figure 2:
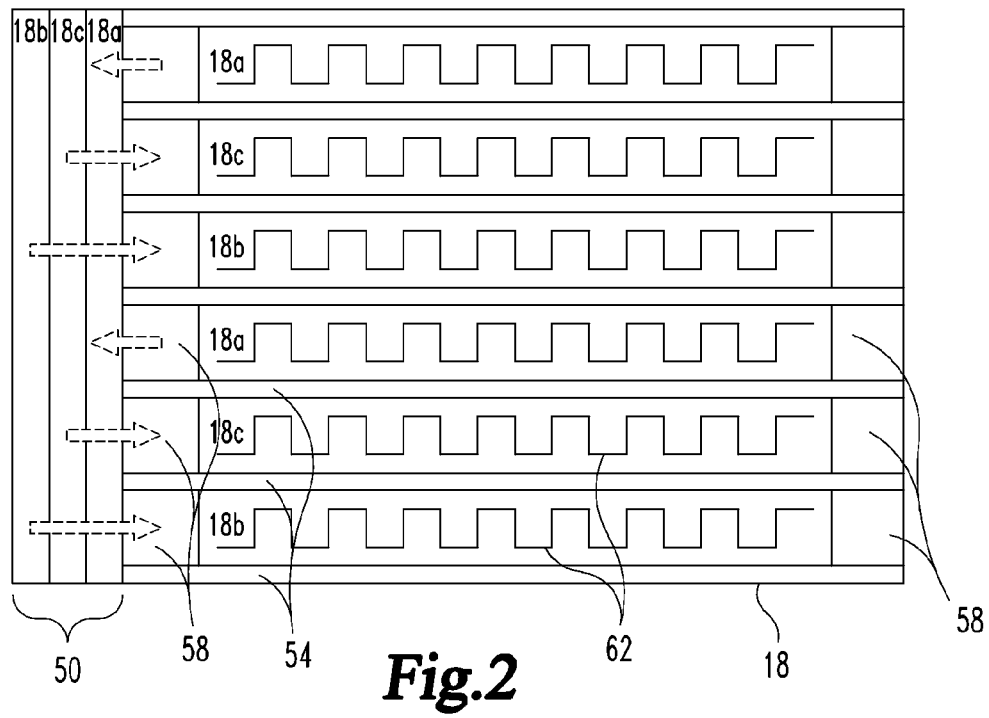
FIG. 2 is a cross sectional view of a portion of a three path heat exchanger of the compressed air system of FIG. 1.

With reference to FIG. 2, a first construction of the three-path heat exchanger 18 is schematically illustrated. The three-path heat exchanger 18 is a stacked plate-type heat exchanger and includes a header or manifold 50 that distributes the appropriate fluid across a number of air paths 18a, refrigerant paths 18b, and fluid paths 18c that are layered in an alternating pattern. Thin metal plates 54 separate the adjacent paths 18a-c (i.e., inhibit fluid flow between the paths 18a-c) while providing for heat transfer therebetween, and metal bars or blocks 58 seal the periphery of each plate 54 and separate the plates 54 from one another. The blocks 58 define apertures or gaps in the periphery that allow fluid flow between the manifold 50 and the respective fluid flow channels that are formed between the plates 54. These apertures are represented by the arrows on the left side of FIG. 2 that depict the flow direction for each fluid as it travels through the heat exchanger core between the manifold 50 shown on the left side of FIG. 2 and the manifold (not shown) on the right side of FIG. 2. Fins 62 may be provided within each flow path to guide the fluid and encourage turbulent flow and increase the heat transfer characteristics of the heat exchanger 18, or alternatively the plates 54 may be shaped to provide turbulent flow. Accordingly, the plates 54, blocks 58, and fins 62 of the plate-type heat exchanger cooperate to define a series of flow paths through which the air, the refrigerant, or the glycol/water mix flows such that heat, but not fluid, is exchanged between the respective fluid flows.

Because of the planar configuration of the flow channels, each flow path in the illustrated stacked plate heat exchanger is adjacent to just two others, which corresponds to the flow path immediately above and the one immediately below as viewed in FIG. 2. Non planar heat exchangers and/or those providing more than two neighbors for each flow path are also contemplated. For example, the heat exchanger 18 may be constructed as a shell and tube style.

With continued reference to FIG. 2, which only represents the initial plates in a repeating stack of plates, the paths 18a-c cycle in order through the three-path heat exchanger. Thus, aside from the paths positioned at the extreme ends (i.e. the top and bottom of FIG. 2) each air path 18a is adjacent one refrigerant path 18b and one fluid path 18c, each refrigerant path 18b is adjacent one air path 18a and one fluid path 18c, and each fluid path is adjacent one air path 18a and one refrigerant path 18b. Thus, the overall number of channels and corresponding cross sectional area devoted to each of the three fluids is generally equal. Any of the paths 18a-c may begin or end the sequence, but in a preferred designs, each air path 18a is adjacent at least one fluid path 18c, and each fluid path 18c is adjacent at least one refrigerant path 18b.

Figure 3:
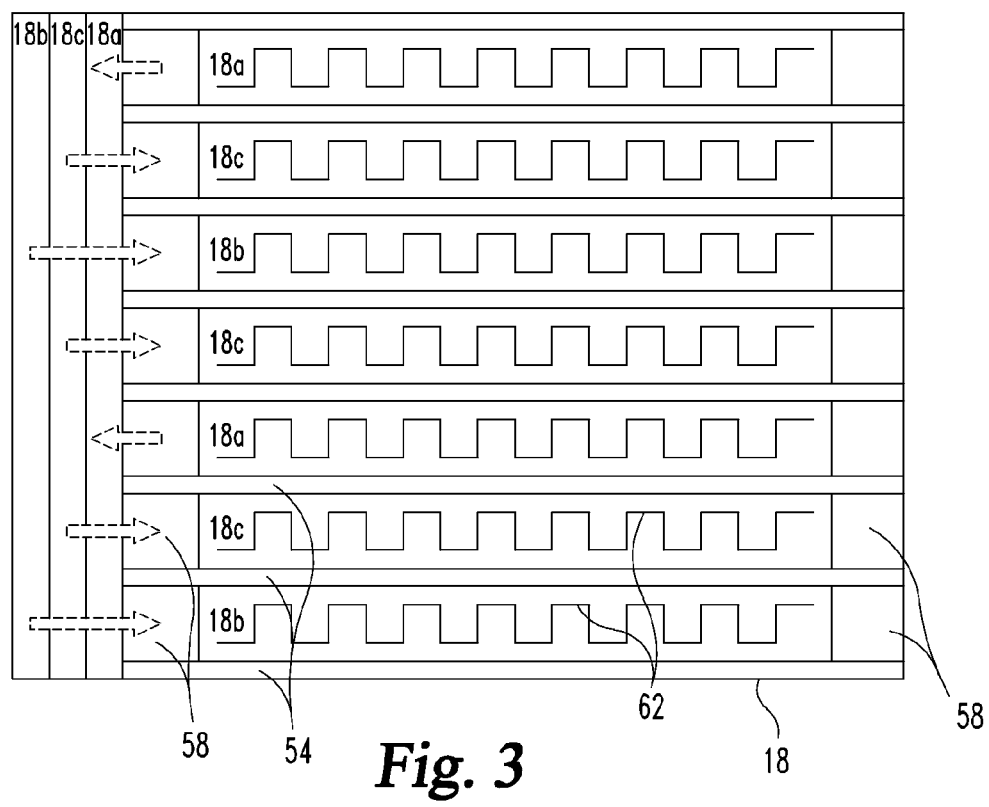
FIG. 3 is a cross sectional view of a portion of an alternative three path heat exchanger of the compressed air system of FIG. 1.

FIG. 3 shows an alternative arrangement for the stacking of the plates in the three-path heat exchanger 18. The structural features of the heat exchanger are the same as shown in FIG. 2 and are numbered with like numerals. In this alternative plate style construction, every other channel is a fluid path 18c. As such, each air path 18a is adjacent two fluid paths 18c and each refrigerant path 18b is adjacent two fluid paths 18c. This interleaving sequence enhances the heat transfer area between the glycol/water mix in the fluid path 18c and the compressed air in the air path 18a, because there is now a fluid path 18c on both sides of each air path (as opposed to being on only one side as in FIG. 2), which can serve to achieve a better approach temperature between the compressed air and the glycol/water mix.

The general fluid flow direction through the heat exchanging core for each fluid is indicated by the arrows in FIGS. 2 and 3. Thus, in each of the illustrated constructions the flow of air through the heat exchanger 18 is in a first direction, and the flow of the refrigerant and the flow of the glycol/water are in a direction opposite to the first direction. In other words, the air and glycol are in a predominantly counter flow arrangement whereas the glycol and refrigerant are in a predominantly co-flow arrangement, as it is to be understood that the manifold for each fluid may be physically separated rather than all together as depicted in FIGS. 2 and 3. In other constructions, the glycol flows in the same direction as the air and in a direction that is opposite to the refrigerant. Having the glycol and air in a predominantly co-flow arrangement with the refrigerant in a predominantly counter flow has been found through experimentation to improve temperature control of the compressed air near freezing temperatures. Other arrangements of flow directions within the heat exchanger 18 are also contemplated, such as having two or the fluids in a cross-flow arrangement.

Turning back to FIG. 1, the liquid separator 22 includes a compressed air inlet 66, a compressed air outlet 70, and a liquid drain line 74. The illustrated liquid separator 22 separates liquid water from dry compressed air by vortex action. Alternatively, the liquid separator 22 may use coalescing action or another method to remove liquid from the dry compressed air, such as by having the air flow through a demister pad. The liquid drain line 74 removes the collected liquid water and other contaminates from the system. Other liquid separators are known and may be used, as desired.

Operation of the air compressor system will be described with respect to FIG. 1. In operation, the air compressor 10 produces wet compressed air at a first temperature A. The wet compressed air passes through the precooling path 14a of the precooler/reheater 14, expels heat to the reheating path 14b, and is cooled to a second temperature B lower than the first temperature A, at which point some water may begin to condense from vapor to liquid. The wet compressed air then flows through the air path 18a of the three-path heat exchanger 18, expels heat to the refrigerant path 18b and/or the fluid path 18c, and is cooled to a third temperature C below the second temperature B such that water further condenses from vapor to liquid. The wet compressed air then flows through the liquid separator 22 where the condensed liquid water is separated to create dry compressed air. The dry compressed air then flows through the reheating path 14b of the precooler/reheater 14 where heat is exchanged with the incoming wet compressed air in the precooling path 14a and is heated to a fourth temperature D higher than the third temperature C. Raising the temperature of the dry compressed air to the fourth temperature D inhibits condensation from forming on the outside of downstream plumbing. Downstream of the precooler/reheater 14, the dry compressed air at the fourth temperature D is available at the point of use 26.

As noted previously, the refrigerant circuit 6 draws heat from the air circuit 4 and/or the heat transfer/storage fluid circuit 8 via a refrigeration cycle, with the refrigerant path 18b of the three path heat exchanger 18 serving as the evaporator in the refrigerant cycle. When the refrigeration circuit 6 is active, refrigerant flows through the refrigerant path 18b of the three-path heat exchanger 18 such that there is a net absorption of heat from the air path 18a and/or the fluid path 18c. When the refrigeration circuit 6 is inactive, no refrigerant flows and there is no cooling provided by the refrigeration circuit. In this mode, cooling of the air is provided by the fluid circuit 8.

The controller 40 monitors the temperature of the glycol/water mix entering the three-path heat exchanger 18 and controls the operation of the refrigerant circuit 6 based on that temperature. In one mode of operation, the refrigerant circuit 6 is controlled so as to maintain the temperature above a low set point and below a high set point. At the low setpoint temperature of the glycol/water mix, the refrigeration circuit 6 is deactivated. At a high setpoint temperature of the glycol/water mix, the refrigeration circuit 6 is activated. The low setpoint temperature and the high setpoint temperatures are selected to avoid freezing of the liquid water condensate and to create a desired average compressed air temperature (and thus dew point condition) in the compressed air.

The illustrated refrigeration circuit 6 operates in an ON/OFF mode to reduce energy consumption. When the refrigeration circuit is inactive (OFF) the refrigerant compressor 30 consumes no energy. The heat transfer/storage fluid circuit 8 allows the air compressor system to maintain adequate cooling of the compressed air within the three-path heat exchanger 18 even when the refrigerant circuit 6 is inactive (OFF). In another construction, a variable speed refrigerant compressor could be used such that the refrigeration circuit 6 cycles ON/OFF below a certain compressor speed such that the cooling capacity is maintained while realizing energy savings. In yet other constructions, modulated or unloaded compressors may be used, as desired.

When the refrigeration circuit 6 is active, heat flows into the refrigeration channels 18b from any of the adjacent channels (18a or 18c), as both the heat transfer fluid and the air are warmer than the refrigerant. However, because heat also flows from the air channels (18a) to the fluid channels (18c), the net effect on the temperature of the heat transfer fluid may vary with operating conditions. If the cooling capacity of the refrigeration circuit 6 is not exceeded (i.e., the system has extra cooling capacity), the refrigerant is able to extract more heat from the glycol/water mix than is absorbed into the mix from the air, thereby reducing the temperature of the glycol/water mix exiting the heat exchanger 18 as well as the compressed air. If the cooling capacity of the refrigeration circuit 6 is temporarily exceeded (i.e., the compressed air is absorbing all available cooling capacity) the temperature of glycol/water mix exiting the heat exchanger may continue to rise, but the immediate impact on the bulk temperature of the fluid in tank 42 will be minimal due to the large size of fluid reservoir. Accordingly, the pre-cooled glycol/water mix is still able to supplement the cooling capacity of the refrigeration circuit 6.

When the refrigeration system is off, the cooling of the compressed air is accomplished via heat exchange with the glycol/water mix, which means the glycol/water mix absorbs heat from the compressed air to reduce the temperature of the compressed air. Such heat transfer also causes the temperature of the glycol/water mix to rise. Once the temperature of the glycol/water mix entering the heat exchanger becomes insufficient to meet the cooling needs of the air flow, which is determined by the temperature of the fluid reaching the high setpoint temperature, the controller 40 activates the refrigeration circuit 6, which begins the process of cooling the glycol/water mix. In this way, the heat transfer/storage fluid circuit 8 functions to store and release the cooling capacity of the refrigeration circuit 6.

The adjacency of the three flow paths 18$a$-$c$ within heat exchanger 18 permits close coupling of the desired heat transfer effects such that at maximum load, heat transfer can occur between the compressed air and the refrigerant either directly or through the heat transfer fluid. Such adjacency also permits the smallest possible refrigeration system as there is no intermediate heat transfer step to increase the temperature difference. Another advantage of the system is to avoid the cost of a separate heat exchanger for the purpose of heat transfer from the glycol/water mix to the refrigerant. Multiple adjacent flow paths (e.g., 18$a$-$c$) in a repeating pattern permit optimization of the flow area or of heat transfer area.

Further, the provision of dual modes of cooling that can act simultaneously increases the peak cooling capacity of the system, thereby enhancing the ability of the system to handle variations in the airflow to be cooled. When the cooling capacity of the refrigeration circuit 6 is more than required to cool the compressed air, the fluid transfer fluid is cooled and the cooling capacity is stored in the fluid circuit 8. When a high demand period occurs that neither the fluid circuit 8 nor the refrigerant circuit 6 would have the capacity to handle independently, the ability to apply both to the air chiller the same time can meet the cooling demand. In this way, the combination of the heat transfer/storage fluid circuit 8 with the refrigeration circuit 6 reduces the number of situations where the temperature of the compressed air is not fully cooled.

Figure 4:
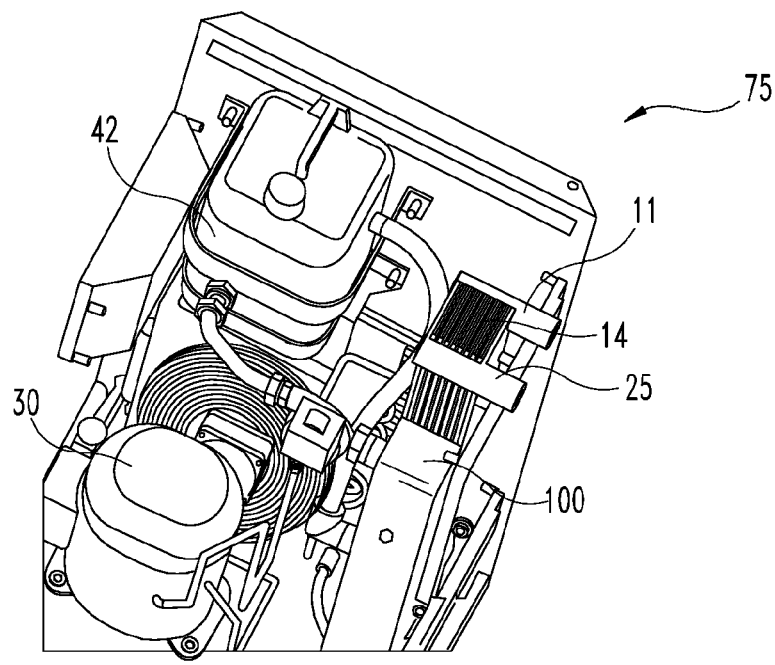
FIG. 4 is a top perspective view of a refrigerated air dryer for a compressed air system.
Figure 5:
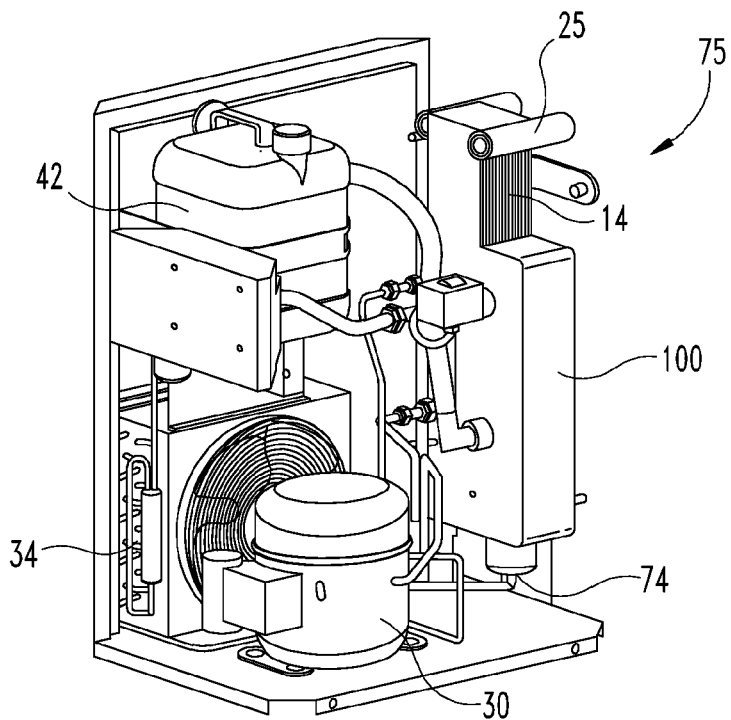
FIG. 5 is perspective view of the refrigerated air dryer of FIG. 4.
Figure 6:
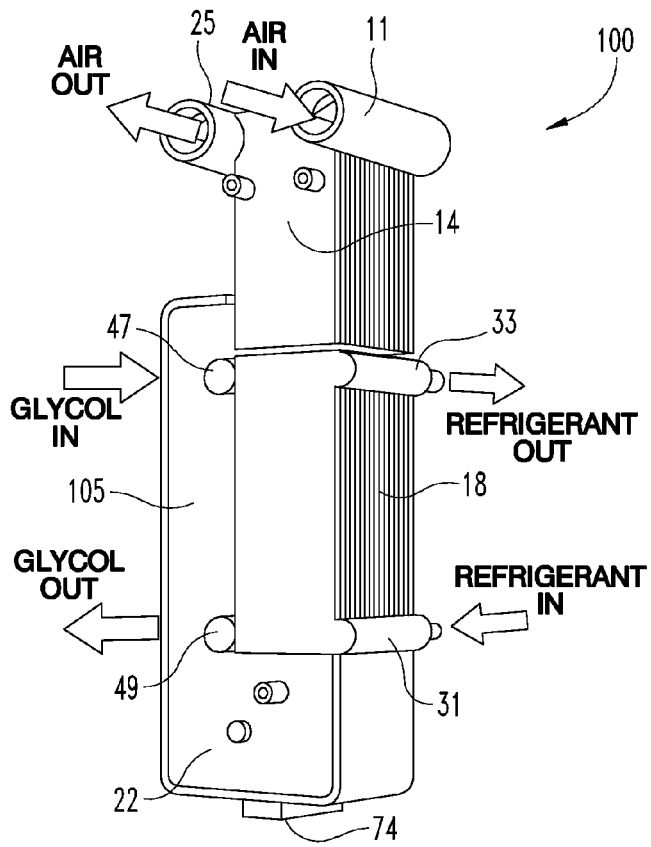
FIG. 6 is perspective view of the combined heat exchanging unit for the air dryer of FIG. 4.
Figure 7:
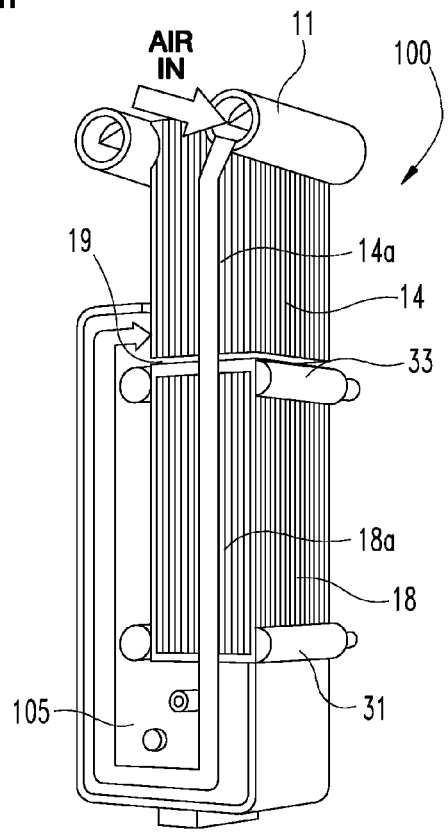
FIG. 7 is a view of the FIG. 6 heat exchanging unit with a portion removed.
Figure 8:
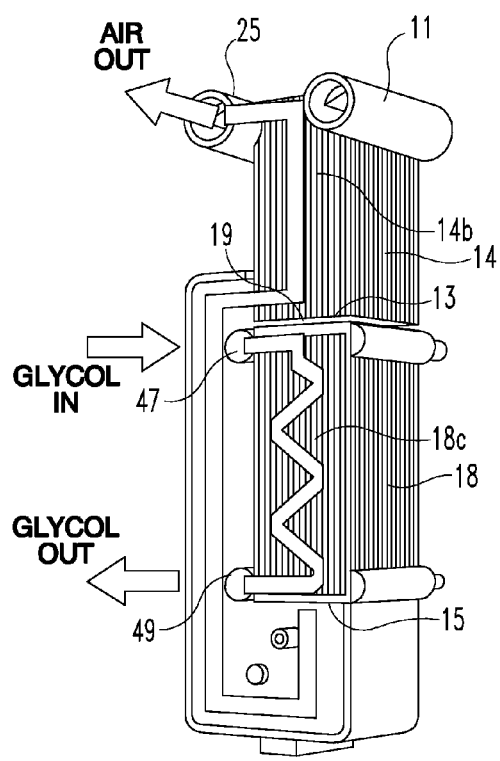
FIG. 8 is a view of the FIG. 6 heat exchanging unit with another portion removed.
Figure 9:
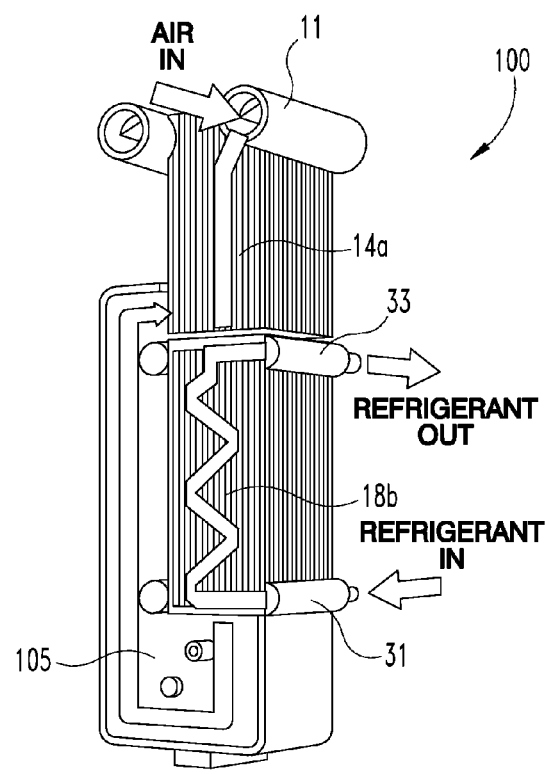
FIG. 9 is a view of the FIG. 6 heat exchanging unit with another portion removed.

FIGS. 4 and 5 show an exemplary refrigerated air dryer 75 according to FIGS. 1 and 3 in which the precooler/reheater 14, the three path heat exchanger 18 and the liquid separator 70 are provided in an integrated heat exchanging unit 100. The general operation of the various fluid flows through the integrated unit 10 are shown schematically in FIGS. 6 to 9, and details of the integrated unit 100 construction are shown in FIGS. 10-15.

Figure 10:
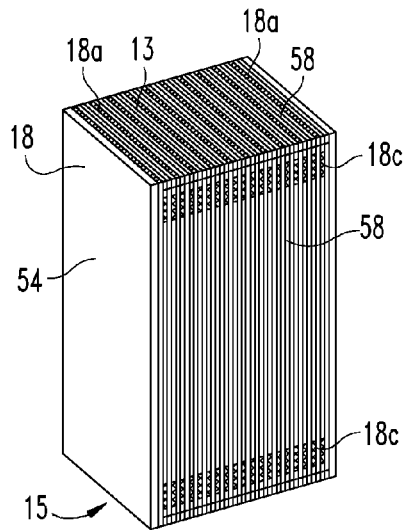
FIG. 10 is a detailed perspective view of the three path heat exchanger core used in the FIG. 6 unit.
Figure 11:
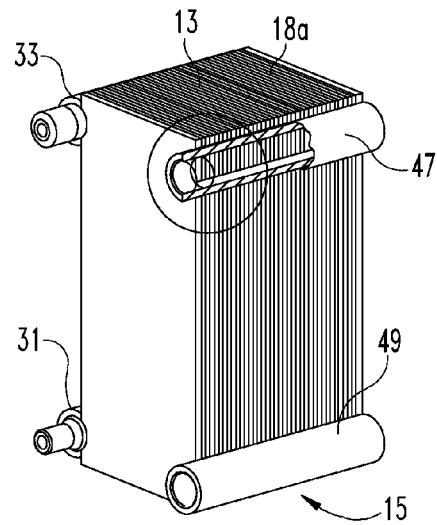
FIG. 11 is a detailed perspective view of the three path heat exchanger core of FIG. 10 with the fluid and refrigerant manifolds attached and with fluid inlet manifold shown in partial section.
Figure 12:
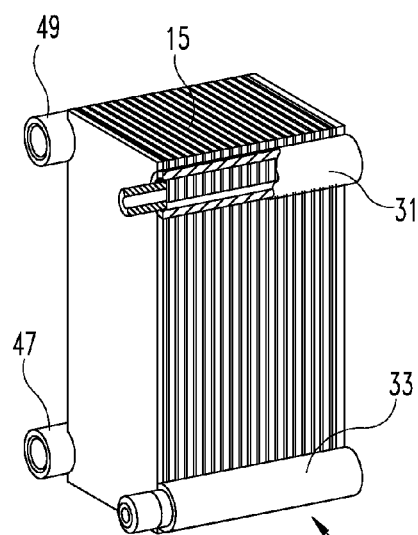
FIG. 12 is the heat exchanger core rotated of FIG. 11 rotated 180 degrees and showing the refrigerant inlet manifold in partial section.
Figure 11A:
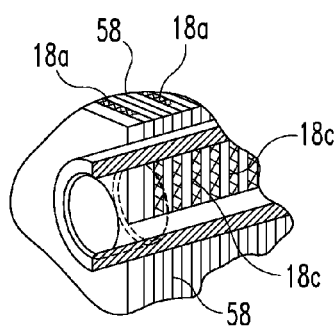
FIG. 11A is a detailed view of the cutaway section of the fluid inlet manifold as indicated in FIG. 11.
Figure 12A:
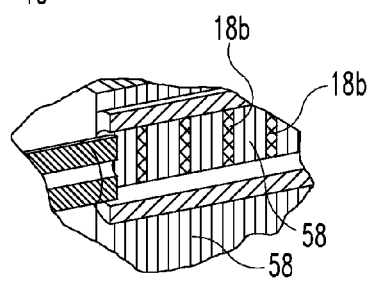
FIG. 12A is a detailed view of the cutaway section of the refrigerant inlet manifold as indicated in FIG. 12.
Figure 13:
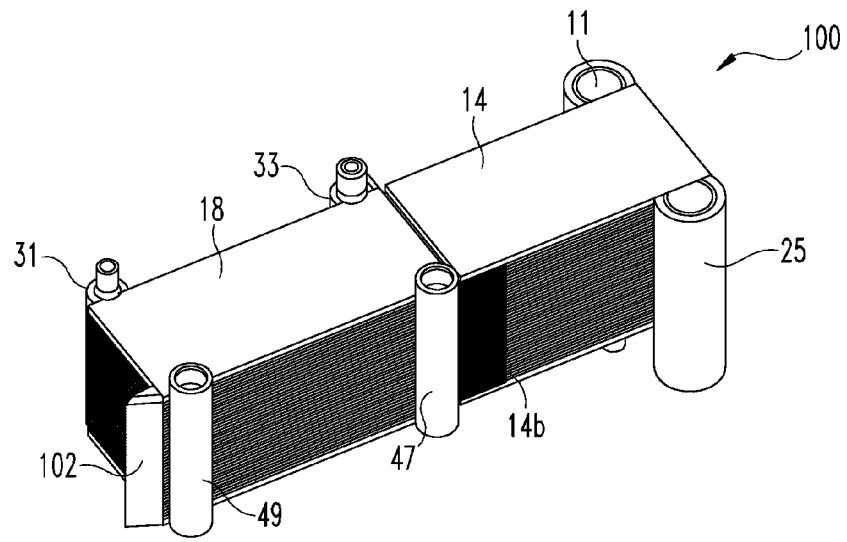
FIG. 13 is a perspective view of the combined heat exchanging unit of FIG. 6 partially assembled.
Figure 15:
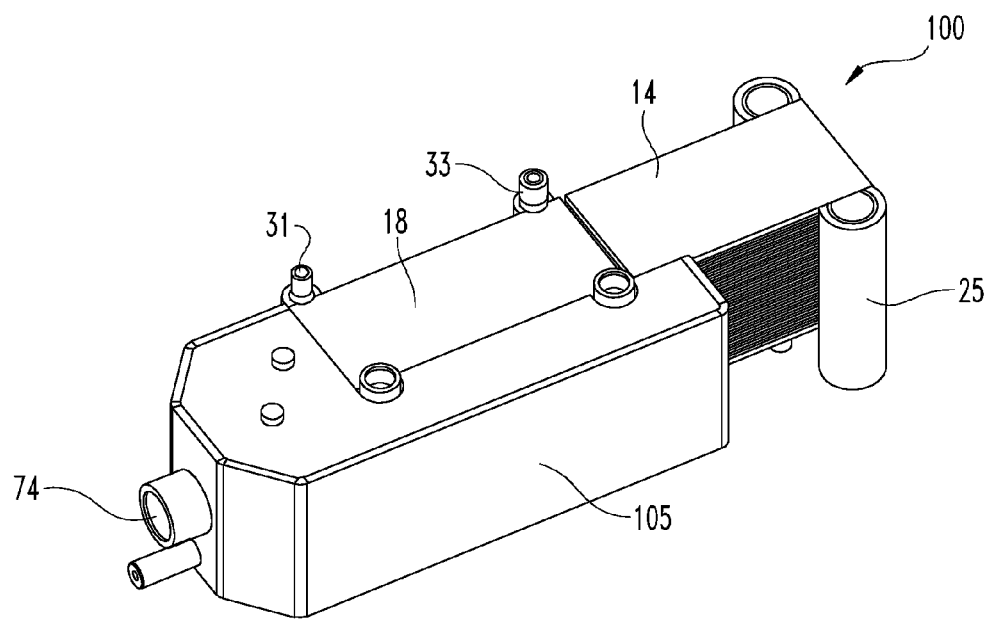
FIG. 15 is a perspective view of the combined heat exchanging unit of FIG. 6
Figure 14:
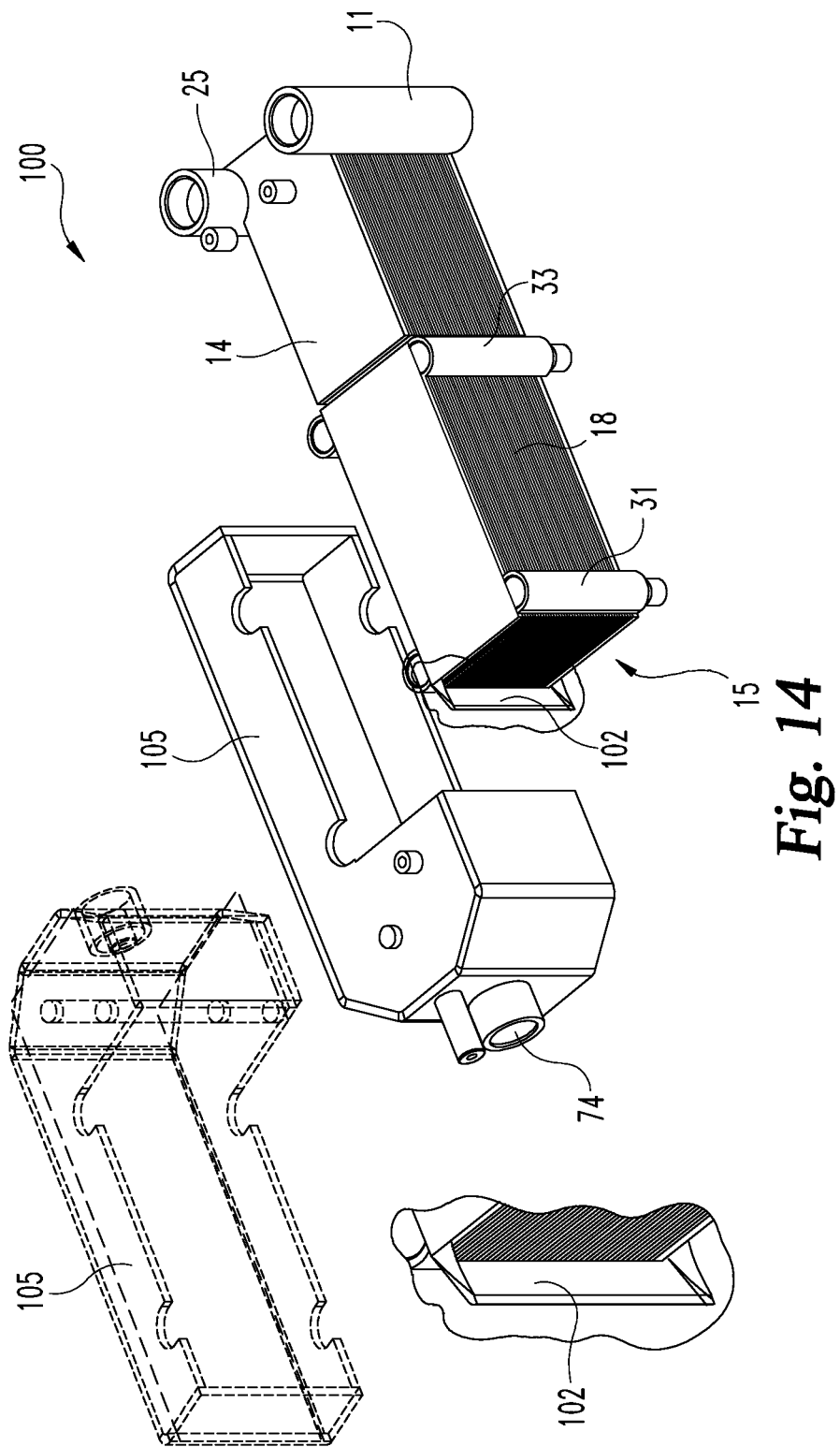
FIG. 14 is an exploded perspective view of the combined heat exchanging unit of FIG. 6.

As noted previously, each of the heat exchangers 14 and 18 are made of stacked plate design with bars 58 sealing the periphery of the each flow passage and separating the plates 54 from each other. As illustrated each heat exchanger has a core generally in the shape of a rectangular solid, as can be seen with respect to the chiller core 18 as shown in FIG. 10, and where there are gaps in the bars 58 forming the inlet apertures, the corrugated structures corresponding to the fins 62 are visible in FIGS. 10-13. Within the unit 100 the precooler/reheater 14 is positioned vertically above the chiller 18.

With respect to the construction of the chiller 18, it should first be noted that the chiller 18 utilizes the alternating arrangement of FIG. 3, which is to say the interleaving pattern is air (18$a$), fluid (18$c$), refrigerant (18$b$), fluid (18$c$), air (18$a$), fluid (18$c$), refrigerant (18$b$), fluid (18$c$), etc. Thus, every other layer in the chiller 18 is a fluid path 18$c$, every fourth layer is an air path 18$a$, and every fourth layer is a refrigerant path 18$b$. The fluid inlet manifold 47 and fluid outlet manifold 49 are provided at either end of one of the lateral sides of the chiller, and the refrigerant inlet manifold 31 and outlet manifold 33 are positioned on the opposing lateral side of the chiller core. The refrigerant and heat transfer fluid that enters from these side manifolds is distributed across the core and then flows generally vertically as viewed in FIG. 10. The inlets for the air passages 18$a$ extend substantially across the air inlet face 13 and the outlets extend substantially across the air outlet face 15 such that the air flow through the chiller 18 is vertically downward. Accordingly, the flow of fluid through the chiller 18 is predominantly in co-flow with the air, and the flow of refrigerant through the chiller 18 is predominantly counter to both the fluid and the air.

The precooler/reheater 14 is constructed similarly, but as there are only two sets of alternating passages, every other layer is a precooling path 14$a$ and every other layer is a reheating path 14$b$. Air from the compressor 10 enters the inlet manifold 11 in the upper right corner as viewed in FIG. 6 and is distributed across the prechiller passages 14$a$, and then flows vertically downward exiting though the outlet face of the precooler/reheater 14 that faces the air inlet face 13 of the chiller 18 (see FIG. 10) and traversing the gap 19 between the faces before entering the inlet face 13. The gap 19 serves as a manifold that allows the air from two of the precooler paths 14$a$ to merge into one chiller path 18$a$. The air then passes vertically downward through the chiller passages 18$a$ and exits the air outlet face 15 of the chiller 18. A coalescing filter known as a demister pad (not shown) is retained against the air outlet face 15 of the chiller 18 by a retaining lip 102 and serves to extract condensed moisture from the air exiting the chiller 18. The now dry air is then directed by the wraparound manifold 105 into the openings to the reheater passages 14$b$ in the side of the reheater 14 visible to the right of the fluid inlet manifold 47 in FIG. 13. The air then flow upwards through the reheater passages 14$a$ and exits the outlet manifold 25 to be sent to the point of use.

It is to be appreciated that what has been described includes a novel heat exchange apparatus for cooling and recovering moisture from a gas, comprising a first fluid circuit in which the gas to be cooled is conveyed, a second fluid circuit through which a supply of a thermal storage fluid from an insulated tank is circulated, the second fluid circuit having a heat transfer section adjacent a cooling section of the first fluid circuit so as to be in heat exchange relationship therewith, and a third fluid circuit through which a refrigerant is circulated, the third fluid circuit having a heat transfer section adjacent the heat transfer section of the second fluid circuit so as to be in heat exchange relationship therewith. The third fluid circuit may further include a compressor and a controller for the compressor is coupled to a temperature sensor in the second fluid circuit. The controller may be configured so as to activate the compressor when the temperature in the second fluid circuit exceeds a predetermined level and to deactivate the compressor when the temperature in the second fluid circuit is below a predetermined level. The first fluid circuit may include a precooling section upstream from the cooling section and a reheating section downstream from the cooling section, wherein the precooling section is adjacent the reheating section so as to be in heat exchange relationship therewith. The first fluid circuit may include a liquid separator between the precooling section and the reheating section. The precooling section may include a plurality of precooling flow paths through a first heat exchanger core, the cooling section includes a plurality of cooling section flow paths through a second heat exchanger core, and the reheating section may include a plurality of reheating flow paths through the first heat exchanger core. The first fluid circuit may include an inlet manifold configured to distribute incoming gas to the precooling flow paths and a return gas manifold configured to receive gas outlet from the cooling section flow paths and distribute it to the reheating section flow paths. The first heat exchanger core may define a gas outlet face through which gas exits the precooling flow paths and the second heat exchanger core may define a gas inlet face through which gas enters the cooling section flow paths, wherein the gas outlet face of the first heat exchanger core is facing the gas inlet face of the second heat exchanger core. The heat exchanging section of the second fluid circuit may include a plurality of fluid flow paths through the second heat exchanger core and the heat exchanging section of the third fluid circuit may include a plurality of refrigerant flow paths through the second heat exchanger core. At least one of the cooling section flow paths may be adjacent at least two of the fluid flow paths. At least one of the cooling section flow paths may be adjacent a fluid flow path and a refrigerant flow path. At least one of the refrigerant flow paths may be adjacent at least two of the fluid flow paths.

What has also been described is a method for drying compressed air, with any of the heat exchange apparatus noted above comprising, flowing compressed air through the first fluid circuit while circulating the thermal storage fluid through the second fluid circuit such that compressed air is cooled as it flows through the cooling section and moisture condenses from the air and the temperature of the thermal storage fluid rises, and then flowing compressed air while circulating the thermal storage fluid and while circulating the refrigerant such that both the compressed air and the thermal storage fluid are cooled as they pass though the heat exchanger apparatus. The method may further include monitoring a temperature of the thermal storage fluid, and circulating the refrigerant based on the temperature of the thermal storage fluid.

What has also been described is a fluid compression system, comprising a chiller core having a first set of flow paths in heat exchange relationship with a second set of flow paths and a third set of flow paths, a thermal storage fluid circuit comprising an insulated tank containing a supply of a thermal storage fluid and a pump operable to circulate the thermal storage fluid through the first set of flow paths of the chiller core, a refrigeration circuit comprising a refrigerant compressor operable to produce a flow of refrigerant through the second set of flow paths of the chiller core, and a fluid compressor operable to produce a flow of compressed fluid through the third set of flow paths of the chiller core. The refrigerant compressor may be controlled based on a temperature of the thermal storage fluid. The system may further include prechiller/reheater core having a set of prechiller flow paths in heat exchange relationship with a set of reheater flow paths, wherein the prechiller flow paths are in upstream fluid communication with the third flow paths of the chiller core and the reheater flow paths are in downstream fluid communication with the third flow paths of the chiller core. The system may further include a liquid separator operable to extract liquid which condenses from the compressed fluid in the third flow paths of the chiller core.

Any theory, mechanism of operation, proof, or finding stated herein is meant to further enhance understanding of embodiments of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiment of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A heat exchange apparatus for cooling and recovering moisture from a gas, comprising:
   a first fluid circuit in which the gas to be cooled is conveyed;
   a second fluid circuit through which a supply of a thermal storage fluid from an insulated tank is circulated, the second fluid circuit having a heat transfer section adjacent a cooling section of the first fluid circuit so as to be in heat exchange relationship therewith;
   a third fluid circuit through which a refrigerant is circulated, the third fluid circuit having a heat transfer section adjacent the heat transfer section of the second fluid circuit so as to be in heat exchange relationship therewith; and
   wherein each of the first, second and third fluid circuits include a pair of flow passageways extending in heat transfer relationship through a common three path heat exchanger.

2. The apparatus of claim 1 in which the third fluid circuit includes a compressor and a controller for the compressor is coupled to a temperature sensor in the second fluid circuit.

3. The apparatus of claim 2 in which the controller activates the compressor when the temperature in the second fluid circuit exceeds a predetermined level.

4. The apparatus of claim 2 in which the controller deactivates the compressor when the temperature in the second fluid circuit is below a predetermined level.

5. The apparatus of claim 1 in which the first fluid circuit includes a precooling section upstream from the cooling section and a reheating section downstream from the cooling section, wherein the precooling section is adjacent the reheating section so as to be in heat exchange relationship therewith.

6. The apparatus of claim 5 in which the first fluid circuit includes a liquid separator between the precooling section and the reheating section.

7. The heat exchange apparatus of claim 1, wherein each of the passageways of the first fluid circuit are positioned adjacent only to passageways of the third fluid circuit within the common three path heat exchanger.

8. The heat exchange apparatus of claim 1, wherein each of the passageways of the first fluid circuit are positioned adjacent at least one of the passageways of the third fluid circuit and adjacent at least one of the passageways of the second fluid circuit within the common three path heat exchanger.

9. The heat exchange apparatus of claim 1, wherein each of the passageways of the first, second and third circuits are formed substantially parallel to one another within the common three path heat exchanger.

10. The heat exchange apparatus of claim 1, wherein each of the passageways of the first, second and third circuits include a substantially planar configuration within the common three path heat exchanger.

11. The heat exchange apparatus of claim 1, wherein a flow direction of each passageway of the first circuit is opposite to a flow direction of each passageway of the second and third circuits within the common three path heat exchanger.

12. The heat exchange apparatus of claim 1 further comprising a heat transfer fin positioned to promote turbulent flow in at least one of the three circuits within the common three path heat exchanger.

13. A heat exchange apparatus for cooling and recovering moisture from a gas, comprising:
a first fluid circuit in which the gas to be cooled is conveyed;
a second fluid circuit through which a supply of a thermal storage fluid from an insulated tank is circulated, the second fluid circuit having a heat transfer section adjacent a cooling section of the first fluid circuit so as to be in heat exchange relationship therewith;
a third fluid circuit through which a refrigerant is circulated, the third fluid circuit having a heat transfer section adjacent the heat transfer section of the second fluid circuit so as to be in heat exchange relationship therewith;
in which the first fluid circuit includes a precooling section upstream from the cooling section and a reheating section downstream from the cooling section, wherein the precooling section is adjacent the reheating section so as to be in heat exchange relationship therewith; and
in which the precooling section includes a plurality of precooling flow paths through a first heat exchanger core, the cooling section includes a plurality of cooling section flow paths through a second heat exchanger core, and the reheating section includes a plurality of reheating flow paths through the first heat exchanger core.

14. The apparatus of claim 13 in which the first fluid circuit includes an inlet manifold configured to distribute incoming gas to the precooling flow paths and a return gas manifold configured to receive gas outlet from the cooling section flow paths and distribute it to the reheating section flow paths.

15. The apparatus of claim 13 in which the first heat exchanger core defines an gas outlet face through which gas exits the precooling flow paths and the second heat exchanger core defines a gas inlet face through which gas enters the cooling section flow paths, wherein the gas outlet face of the first heat exchanger core is facing the gas inlet face of the second heat exchanger core.

16. The apparatus of claim 13 in which the heat exchanging section of the second fluid circuit includes a plurality of fluid flow paths through the second heat exchanger core and the heat exchanging section of the third fluid circuit includes a plurality of refrigerant flow paths through the second heat exchanger core.

17. The apparatus of claim 16 in which at least one of the cooling section flow paths is adjacent at least two of the fluid flow paths.

18. The apparatus of claim 16 in which at least one of the cooling section flow paths is adjacent a fluid flow path and a refrigerant flow path.

19. The apparatus of claim 16 in which at least one of the refrigerant flow paths is adjacent at least two of the fluid flow paths.

20. A method for drying compressed air using the heat exchange apparatus of claim 1, comprising:
(a) flowing compressed air through the first fluid circuit;
(b) circulating the thermal storage fluid through the second fluid circuit;
(c) selectively circulating refrigerant through the third fluid circuit;
(d) performing (a) while performing (b) such that compressed air is cooled as it flows through a cooling section and moisture condenses from the air;
(e) performing (a) while performing (b) and (c) such that the compressed air is cooled as it flows through the cooling section and moisture condenses from the air;
wherein during (d) the thermal storage fluid is heated as it flows through a heat transfer section such that it returns to the insulated tank warmer than when it left; and
wherein during (e) the thermal storage fluid is cooled as it flows through the heat transfer section such that it returns to the insulated tank cooler than when it left.

21. The method of claim 20 wherein the selectively circulating includes monitoring a temperature of the thermal storage fluid, and circulating the refrigerant based on the temperature of the thermal storage fluid.

22. A fluid compression system, comprising:
a chiller core having a first set of flow paths in heat exchange relationship with a second set of flow paths and a third set of flow paths;
a thermal storage fluid circuit comprising an insulated tank containing a supply of a thermal storage fluid and a pump operable to circulate the thermal storage fluid through the first set of flow paths of the chiller core;
a refrigeration circuit comprising a refrigerant compressor operable to produce a flow of refrigerant through the second set of flow paths of the chiller core; and
a fluid compressor operable to produce a flow of compressed fluid through the third set of flow paths of the chiller core.

23. The fluid compression system of claim 22 in which the refrigerant compressor is controlled based on a temperature of the thermal storage fluid.

24. The fluid compression system of claim 22 further comprising a prechiller/reheater core having a set of prechiller flow paths in heat exchange relationship with a set of reheater flow paths, wherein the prechiller flow paths are in upstream fluid communication with the third flow paths of the chiller core and the reheater flow paths are in downstream fluid communication with the third flow paths of the chiller core.

25. The fluid compression system of claim 22 further comprising a liquid separator operable to extract liquid which condenses from the compressed fluid in the third flow paths of the chiller core.

26. The fluid compression system of claim 25 wherein the liquid separator separates the water by at least one of coalescing action and vortex action.

27. A heat exchange apparatus for cooling and recovering moisture from a gas, comprising:
- a first fluid circuit in which the gas to be cooled is conveyed;
- a second fluid circuit through which a supply of a thermal storage fluid from an insulated tank is circulated, the second fluid circuit having a heat transfer section adjacent a cooling section of the first fluid circuit so as to be in heat exchange relationship therewith;
- a third fluid circuit through which a refrigerant is circulated, the third fluid circuit having a heat transfer section adjacent the heat transfer section of the second fluid circuit so as to be in heat exchange relationship therewith;
- in which the third fluid circuit includes a compressor and a controller for the compressor is coupled to a temperature sensor in the second fluid circuit; and
- in which the controller activates the compressor when the temperature in the second fluid circuit exceeds a predetermined level.

28. The apparatus of claim 27 in which the controller deactivates the compressor when the temperature in the second fluid circuit is below a predetermined level.

* * * * *